April 28, 1942. A. C. LANSING 2,281,243
PROCESS FOR SEPARATING MIXTURES OF FORMALDEHYDE
AND VOLATILE ORGANIC COMPOUNDS
Filed Oct. 4, 1939
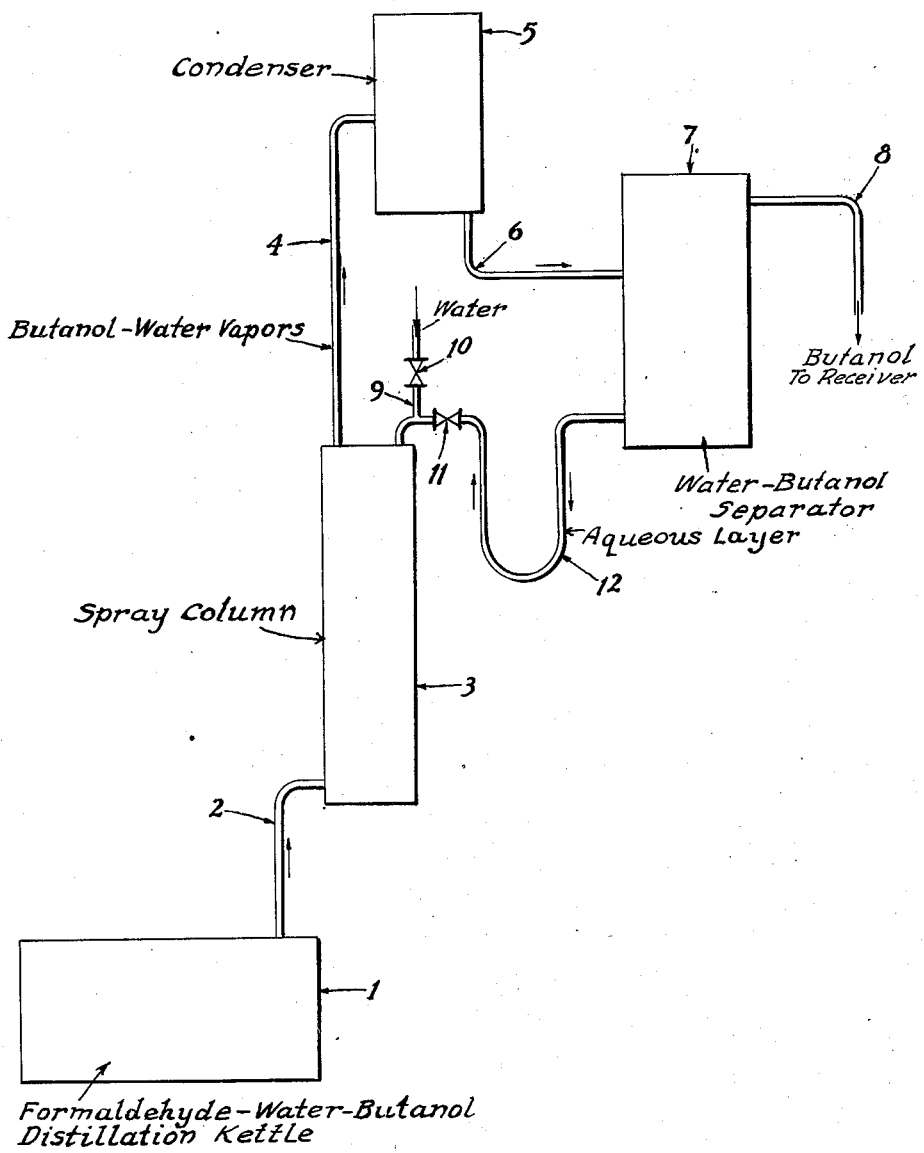

Patented Apr. 28, 1942

2,281,243

UNITED STATES PATENT OFFICE 2,281,243

PROCESS FOR SEPARATING MIXTURES OF FORMALDEHYDE AND VOLATILE ORGANIC COMPOUNDS

Arthur C. Lansing, Terre Haute, Ind., assignor to Commercial Solvents Corporation, Terre Haute, Ind., a corporation of Maryland Application October 4, 1939, Serial No. 297,807

3 Claims. (Cl. 202—66)

My invention relates to a process for the recovery of volatile organic compounds from mixtures containing formaldehyde. More specifically, my invention relates to the separation from such mixtures of substantially water-soluble organic liquids which may be distilled from aqueous mixtures at a temperature below the boiling point of water.

The separation of mixtures of formaldehyde and water-immiscible organic compounds presents no difficulties since the formaldehyde may be removed by a water washing operation. However, in the case of substantially water-soluble organic liquids this procedure cannot be satisfactorily employed. In attempting to separate such mixtures by distillation methods, considerable difficulties are encountered. The formaldehyde distills over with the organic liquid throughout the entire distillation, even when using an efficient fractionating column. Furthermore, the formaldehyde gas tends to polymerize in contact with the heated walls of the apparatus and solid polymers may be deposited in sufficient amounts to completely block the further passage of vapors.

I have now discovered that these difficulties can be overcome if water is passed downward through the fractionating column during the distillation. In accordance with this procedure the organic liquid distills over, usually together with some water, and an aqueous solution of formaldehyde refluxes and remains as a still residue. I have found that very satisfactory separations may be made in this manner in spite of the fact that formaldehyde is normally a gas having a boiling point far below that of any of the organic liquids which may be distilled from the mixtures by this process. Normally it would be expected that formaldehyde, which under ordinary conditions is a gas, would be readily driven off when subjected to temperatures within the range of those at which my process may be carried out, and that the higher boiling organic liquids would be refluxed. Contrary to expectations, however, the opposite phenomenon occurs, i. e., the formaldehyde remains behind in the still, and the organic liquid or an azeotropic mixture of the latter with water is distilled over at a temperature below the boiling point of water.

The organic liquids which may be recovered from formaldehyde-containing mixtures in accordance with my invention constitute organic liquids which are at least partially water soluble and which may be distilled from an aqueous mixture at a temperature below the boiling point of water at the pressure employed. In this connection the term "at least partially water soluble" signifies at least partial water miscibility in the presence of formaldehyde. Thus, ethyl acetate, which is substantially water-immiscible, is sufficiently soluble in water in the presence of formaldehyde to make a water washing process undesirable for removing formaldehyde from such mixtures. Such mixtures, however, may be satisfactorily separated by my water distillation process.

The organic liquids to be recovered by my process may themselves boil below the boiling point of water, or they may have higher boiling points but form azeotropic mixtures with water which distill below the boiling point of water. In any event the distillation is carried out at a temperature below the boiling point of water since obviously at higher temperatures the counter-currently-flowing water would be volatilized out of the column, which in turn would result in the formaldehyde-containing mixture distilling over. My process is especially adapted to the recovery of compounds forming two phase azeotropic mixtures with water, as for example, normal butyl alcohol or isoamyl alcohol. In such cases, the azeotropic mixture which is distilled off may be separated and the water layer returned to the top of the column. However, my process is also operative for the separation of organic liquids which do not form such azeotropic mixtures with water, and any of the organic liquids of the general class defined above may be recovered by my process. As further examples of such compounds, there may be mentioned methyl alcohol, isopropyl alcohol, secondary butyl alcohol, propionaldehyde, butyraldehyde, acetone, methyl ethyl ketone, and dimethyl ether. My process is particularly valuable for the separation of the lower aliphatic alcohols (i. e., those containing less than six carbon atoms) from formaldehyde-containing mixtures.

The concentration of formaldehyde in the mixtures to be separated in accordance with my process may vary within relatively wide limits. However, high concentrations of formaldehyde may require the use of an undesirably large amount of water in the process or necessitate a second water distillation to secure the desired degree of separation. My process is thus most economically applied to mixtures containing relatively low concentrations of formaldehyde and I prefer to utilize mixtures containing less than 10% by weight of formaldehyde.

Since formaldehyde is an extremely reactive compound and can readily polymerize, or undergo condensations with other organic compounds, such as those contained in the mixtures to be separated in accordance with my process, the conditions employed for the distillation should be such as to minimize these reactions. Materials constituting catalysts for such reactions should be absent insofar as possible, and for this reason the mixture to be distilled should have a substantially neutral reaction. Since most of these reactions constitute condensations with the elimination of water, the presence of a large excess of water in the mixture will tend to inhibit the reactions. For this reason it may be desirable to add water to the initial mixture in addition to passing water through the fractionating column. Using these precautions, the formaldehyde reactions are largely inhibited, but may take place to an extent insufficient to interfere with the desired separation. Thus, in separating alcohols from formaldehyde-containing mixtures, small amounts of acetals may be formed. The lower acetals such as methylal will partially remain in the still residue along with the formaldehyde, and the higher acetals such as butyl formal will be almost entirely retained in the still residue. After recovery of formaldehyde from the still residues, such compounds may be hydrolyzed if present in sufficient amounts to warrant the recovery of their constituents.

The amount of water to be passed through the fractionating column in accordance with my process may be varied within relatively wide limits. In general, however, I prefer to introduce an amount of water equal to at least 30% by volume of the condensate being taken off in the distillation. In the case of batch distillation, water cannot be introduced in amounts greater than the volume of condensate being removed, without increasing the volume of material in the distillation vessel. However, in continuous distillation processes a higher ratio of water to condensate can be employed if desired. In general, the higher the ratio of water to condensate, the more complete will be the separation of the organic liquid from formaldehyde. However, higher ratios require greater amounts of heat for the distillation and require handling greater volumes of still residue for the recovery of the formaldehyde, so that economic considerations will determine the most desirable ratio of water to condensate in any given case.

At the conclusion of the distillation process, the distillate and the still residue may be separately refined in accordance with known procedures. The organic liquid in the distillate will usually contain considerable water, which may be removed by distillation processes or other dehydrating methods. The formaldehyde solution remaining as the still residue may be distilled from any non-volatile materials and may be utilized in the form of an aqueous solution, or the formaldehyde may be recovered as paraformaldehyde or converted into other useful products, such as hexamethylene tetramine, in accordance with known procedures.

The accompanying drawing is a diagrammatic representation of the apparatus which may be employed in carrying out one form of the present invention, such as, for example, the separation of formaldehyde from a mixture of water and butanol. In the drawing 1 represents a distillation kettle which contains a mixture of formaldehyde, water, and butanol. The kettle is heated in any convenient manner so as to produce a mixture of vapors which rise through the vapor line 2 to a bubble cap column 3 and from there through vapor line 4 to a condenser 5. The condensate produced in the condenser 5 flows by pipe 6 to a gravity separator 7 in which stratification of the butanol and water occurs. Until the upper butanol layer in said separator begins to overflow through pipe 8, water is sprayed into the bubble cap column 3 from an external source through pipe 9 whereby the formaldehyde component of the vaporous mixture is returned to the kettle 1. When butanol commences to flow through pipe 8, valve 10 is closed and valve 11 opened, thus allowing the contents of the lower aqueous layer in separator 7 to flow through pipe 12, and to contact the ascending vapors in column 3, thereby removing the formaldehyde component of said ascending vapors.

My invention may be further illustrated by the following specific example:

*Example I*

A water saturated solution of butanol, containing approximately 5% by weight of formaldehyde, was placed in a distillation vessel together with approximately 20% by volume of water. The material was distilled through a 30 plate bubble cap column and the condensate was passed through a gravity separator, the water layer being returned to the top of the column. Additional water amounting to approximately 30% by volume of the original charge was introduced during the course of the distillation. All of the butanol was distilled off in the form of a binary azeotropic mixture with water, the conclusion of the distillation being evidenced by failure of the condensate to separate into two phases in the gravity separator. At the conclusion of the distillation the oil layer of the condensate removed from the separator was found to equal 99% by volume of the original charge, whereas the still residue approximated the volume of the water added to the original charge and during the course of the distillation. The oil layer of the condensate, which constituted water-saturated butanol, was dehydrated in the known manner in a subsequent distillation procedure. The final dry butanol was free from formaldehyde odor, and no difficulty was encountered in either distillation with regard to deposition of formaldehyde polymers in the apparatus.

It is to be understood, of course, that the above example is merely illustrative and that the scope of my invention is not limited to the particular procedure there described, nor to the particular materials which have previously been specifically mentioned. My process is adapted to the separation, from formaldehyde-containing mixtures, of any organic liquid which is at least partially water-soluble and which may be distilled from an aqueous mixture at a temperature below the boiling point of water. Likewise, it will be apparent to those skilled in the art that the distillation procedure may be varied in numerous respects. Thus, if the organic liquid in question does not form azeotropic mixtures with water, the water could be introduced into the column at an intermediate point, utilizing the upper portion of the column for further fractionation in order to remove the organic liquid in a substantially anhydrous form. Similarly, a continuous distillation could be effected in a two column system to effect the same end. It is to be understood that all such modifications of procedure, and the use of any equivalents which would normally occur to those skilled in the art, are included within the scope of my invention.

My invention now having been described, what I claim is:

1. In a process for separating from a formaldehyde-containing mixture, an organic liquid which is at least partially water-soluble and which is capable of being distilled from an aqueous mixture at a temperature below the boiling point of water, the steps which comprise distilling said mixture, contacting the resulting vapors containing formaldehyde and the organic liquid countercurrently with water to scrub out the formaldehyde, condensing the organic liquid vapors and water vapors remaining in the vapor phase after contact with the water, separating the organic liquid from the water, and separately recovering the formaldehyde.

2. In a process for separating from a formaldehyde-containing mixture, an aliphatic alcohol containing less than six carbon atoms, the steps which comprise distilling said mixture at a temperature below the boiling point of water, contacting the resulting vapors containing formaldehyde and said aliphatic alcohol countercurrently with water to scrub out the formaldehyde, condensing the vapors of said aliphatic alcohol and water vapors remaining in the vapor phase after contact with the water, separating said aliphatic alcohol from the water, and separately recovering the formaldehyde.

3. In a continuous process for separating butanol from a formaldehyde-containing mixture, the steps which comprise distilling said mixture through a fractionating column and simultaneously passing water downward through at least a portion of said column to scrub out the formaldehyde, condensing the resulting vapors to form a two-phase condensate composed of water and butanol, separating the two-phase condensate into a butanol phase and a water phase, returning the water phase to the top of the column, and withdrawing the formaldehyde from the bottom of the column.

ARTHUR C. LANSING.